United States Patent [19]

Mizuno et al.

[11] Patent Number: 4,816,838

[45] Date of Patent: Mar. 28, 1989

[54] PORTABLE RECEIVING ANTENNA SYSTEM

[75] Inventors: Hiroshi Mizuno, Nagoya; Yoshihisa Shibata, Kariya; Takashi Sakurai, Nagoya, all of Japan

[73] Assignee: Nippondenso Co., Ltd., Kariya, Japan

[21] Appl. No.: 853,176

[22] Filed: Apr. 17, 1986

[30] Foreign Application Priority Data

Apr. 17, 1985 [JP] Japan .............................. 60-081951

[51] Int. Cl.$^4$ .............................................. H01Q 13/10
[52] U.S. Cl. ................................. 343/771; 343/7021; 343/700 MS
[58] Field of Search ............... 343/700 MS, 771, 702, 343/767, 770

[56] References Cited

U.S. PATENT DOCUMENTS

| | | | |
|---|---|---|---|
| 1,759,610 | 5/1930 | Fisher | 343/702 |
| 1,826,437 | 10/1931 | Shapiro et al. | 343/702 |
| 1,854,566 | 4/1932 | Spiro | 343/702 |
| 3,233,242 | 2/1966 | Voronoff | 343/771 |
| 3,363,253 | 1/1968 | Ratkevich et al. | 343/771 |
| 3,990,078 | 11/1976 | Bellee et al. | 343/770 |
| 4,320,402 | 3/1982 | Bowen | 343/700 MS |
| 4,356,492 | 10/1982 | Kaloi | 343/700 MS |
| 4,401,988 | 8/1983 | Kaloi | 343/700 MS |
| 4,464,663 | 8/1984 | Lalezai et al. | 343/700 MS |
| 4,475,111 | 10/1984 | Gittinger et al. | 343/895 |
| 4,507,664 | 3/1985 | James et al. | 343/700 MS |
| 4,644,366 | 2/1987 | Scholz | 343/702 |
| 4,651,312 | 3/1987 | Homma et al. | 343/702 |

FOREIGN PATENT DOCUMENTS

| | | | |
|---|---|---|---|
| 0068960 | 6/1978 | Japan | 343/771 |
| 0114066 | 9/1979 | Japan | 343/702 |
| 0091003 | 6/1982 | Japan | 343/700 MS |
| 1229701 | 5/1986 | U.S.S.R. | 343/709 |
| 269349 | 4/1927 | United Kingdom | 343/702 |
| 765465 | 1/1957 | United Kingdom | 343/700 MS |
| 2161652A | 1/1986 | United Kingdom | 343/700 MS |

OTHER PUBLICATIONS

"DBS High Volume Market for GaAs MMICs", Microwave Journal, Feb. 1983, p. 116.

Primary Examiner—William L. Sikes
Assistant Examiner—Hoanganh Le
Attorney, Agent, or Firm—Cushman, Darby & Cushman

[57] ABSTRACT

A portable receiving antenna system for providing communication with a transmitting station carried by a geostationary satellite. The system includes a portable case, a flat plate antenna arranged to cover an opening of the portable case, and an adjustable support arranged within the portable case to support the flat plate antenna at an incident angle capable of receiving electromagnetic waves from the transmitting station. The flat plate antenna is in the form of a micro strip line slot array antenna including a dielectric layer, a metallic earth film formed with a plurality of spaced slots and secured to the surface of the dielectric layer in such a manner that the slots are arranged to receive the electromagnetic waves from the transmitting station, and a feeder line circuit secured to the rear surface of the dielectric layer. Preferably, an azimuth compass and a converter are mounted within the portable case, the converter being connected to an output terminal of the feeder line circuit.

9 Claims, 5 Drawing Sheets

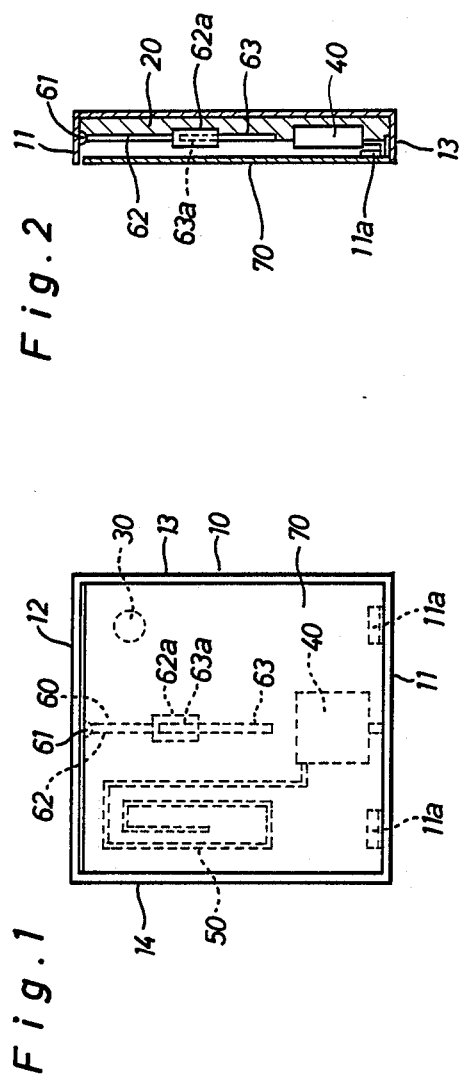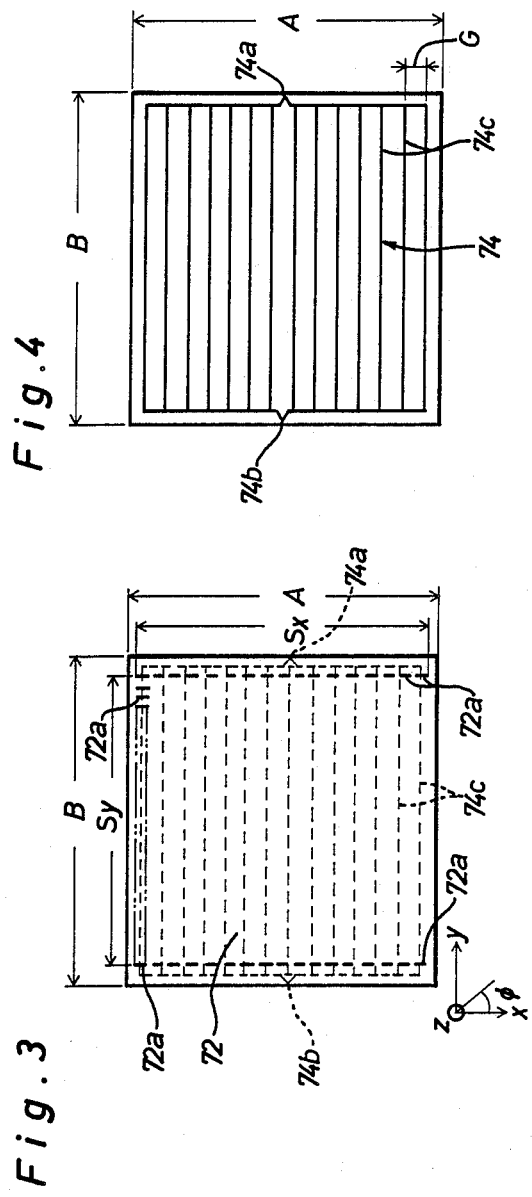
Fig. 2
Fig. 4
Fig. 1
Fig. 3

PORTABLE RECEIVING ANTENNA SYSTEM

BACKGROUND OF THE INVENTION

1. Field of the Invention

The present invention relates to a receiving antenna system for providing communication with a transmitting station, and more particularly to a portable receiving antenna system suitable for providing communication with a transmitting station carried by a geostationary satellite.

2. Description of the Background

Heretofore, in general, a parabolic antenna system has been adapted to provide communication with a transmitting station carried by a geostationary satellite. It is, however, difficult to carry the parabolic antenna system to a desired place due to heavy weight and large size. It is also difficult to install the parabolic antenna system at the desired place for providing communication with the transmitting station on the satellite.

SUMMARY OF THE INVENTION

It is, therefore, a primary object of the present inventon to provide a portable receiving antenna system which can be easily carried to a desired place and installed at the desired place in a simple manner to provide communication with the transmitting station on the geostationary satellite.

According to the present invention, the primary object is accomplished by providing a portable receiving antenna system for providing communication with a transmitting station carried by a geostationary satellite. The antenna system comprises a portable case, a flat plate antenna assembled with the portable case, and an adjustable support arranged within the portable case to support the flat plate antenna at an incident angle capable of receiving electromagnetic waves from the transmitting station. The flat plate antenna is in the form of a mirco strip line slot array antenna including a dielectric layer having first and second surfaces, a metallic earth film formed with a plurality of spaced slots and secured to the first surface of the dielectric layer in such a manner that the slots are arranged to receive the electromagnetic waves from the transmitting station, and a feeder line circuit secured to the second surface of the dielectric layer.

Preferably, the flat plate antenna further comprises a reflection plate arranged in parallel with the feeder line circuit and spaced therefrom in a predetermined distance, the reflection plate being integrally assembled with the dielectric layer.

It is also preferable that an azimuth compass and a converter are mounted within the portable case, the converter being connected to an output terminal of the feeder line circuit.

Alternatively, the flat plate antenna may comprises a dielectric layer having first and second surfaces, a plurality of spaced metallic thin plates secured to the first surface of the dielectric layer and arranged to receive the electromagnetic waves from the transmitting station, a feeder line circuit secured to the first surface of the dielectric layer and connected to the metallic thin plates, and a metallic earth plate secured to the second surface of the dielectric layer.

BRIEF DESCRIPTION OF THE DRAWINGS

Other objects, features and advantages of the present invention will become more apparent from the following detailed description of a preferred embodiment and certain modifications thereof when taken together with the accompanying drawings, in which:

FIG. 1 is a schematic plan view of a portable receiving antenna system in accordance with the present invention;

FIG. 2 is a sectional view of the antenna system shown in FIG. 1;

FIG. 3 is a plan view of a flat plate antenna shown in FIGS. 1 and 2;

FIG. 4 is a rear view of the flat plate antenna in which a reflection plate is removed therefrom;

DETAILED DESCRIPTION OF THE PREFERRED EMBODIMENTS

Figure 5:
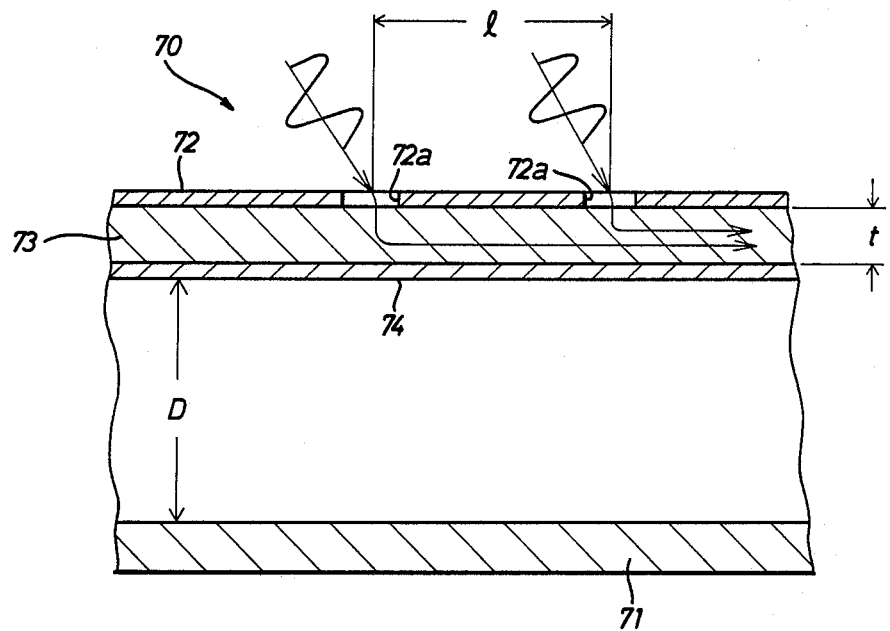
FIG. 5 is an enlarged sectional view of a part of the flat plate antenna.

Referring now to the drawings, a portable receiving antenna system shown in FIGS. 1 and 2 includes a square portable receiver case 10 which contains therein a base plate 20 mounting thereon an azimuth compass 30, a BS-converter 40, an IF-cable 50 and a support assembly 60. The square receiver case 10 has a square opening which is closed by a square cover in the form of a flat plate antenna 70.

The azimuth compass 30 is embedded within the base plate 20 in such a manner that the indication surface of compass 30 is exposed outwardly at a place adjacent a corner of rear and right-side walls 12 and 13 of the receiver case 10 and that the standard directional indication scale of compass 30 is arranged perpendicularly to a front wall 11 of receiver case 10. When the pointer of compass 30 coincides with the standard directional indication scale, it is pointed to a geostationary satellite. The BS-converter 40 is embedded within the base plate 20 at a place adjacent the center of front wall 11 of container case 10 to translate an output frequency from the flat plate antenna 70 into an input frequency for a television set. The IF-cable 50 is detachably embedded within the left-hand portion of base plate 20 to connect the BS-converter 40 to the television set.

As shown in FIGS. 1 and 2, the support assembly 60 includes a universal joint 61 and a pair of support rods 62 and 63. The universal joint 61 is secured to an internal surface of rear wall 12 of receiver case 10. The support rod 62 is connected at its one end with the universal joint 61 to be moved in an appropriate direction and is integrally provided at its other end with a sleeve like female screw element 62a. The support rod 63 has a male screw end 63a adjustably threaded into the female screw element 62a of support rod 62. The support rods 62 and 63 are detachably embedded within the center of base plate 20. Each entire length of the support rods 62 and 63 is determined to support the flat plate antenna 70 at an incident angle capable of receiving communication from a transmitting station carried by a geostationary satellite. In addition, the relative length of support rods 62 and 63 is adjusted for fine adjustment of the incident angle of flat plate antenna 70.

As shown in FIGS. 3-6, the flat plate antenna 70 is composed of a reflector plate 71, a metallic earth film 72, a dielectric layer 73 and a feeder line circuit 74. The metallic earth film 72, dielectric layer 73 and feeder line circuit 74 are arranged to provide a micro strip line slot array antenna. As shown in FIGS. 1 and 2, the flat plate antenna 70 is attached at one side thereof to the front wall 11 of receiver case 10 by means of a pair of hinges 11a, 11a to open and close the receiver case 10. The reflection plate 71 is in the form of a square conductive plate made of aluminum, which reflection plate 71 is arranged behind the feeder line circuit 74 and in parallel with the same and is integrally assembled with the micro strip line slot array antenna as a reinforcement member thereof. The reflection plate 71 is spaced in a predetermined distance D from the feeder line circuit 74 to prevent radiation from the latter. The metallic earth film 72 is in the form of a square copper film which is formed with a plurality of rectangular slots 72a—72a spaced in parallel. In the case shown in FIGS. 3 and 6, an angle $\phi$ of radius vector is determined with respect to an X-axis in a X-Y plane and an angle $\theta$ of radius vector is determined with respect to a Z-axis in an X-Z plane, the slots 72a—72a are arranged in the number of $S_x$ in a direction along the X-axis and arranged in the number of $S_y$ in a direction along the Y-axis. The total number of slots 72a is determined by $S_x \cdot S_y$.

Figure 6:
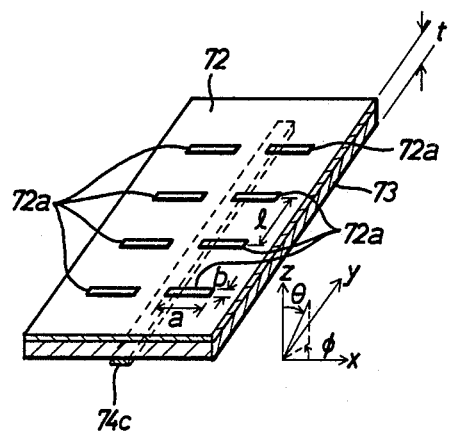
FIG. 6 is a partly broken perspective view of the flat plate antenna.
Figure 11:
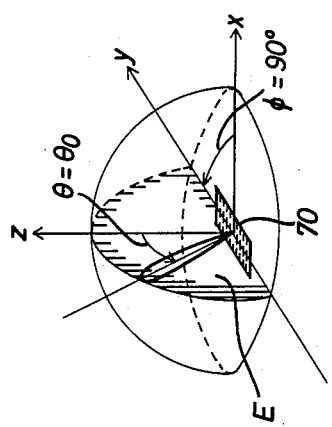
FIGS. 11 and 12 each illustrate a spatial position of the flat plate antenna for determination of the respective radiation patterns shown in FIGS. 9 and 10.

As shown in FIG. 6, the slots 72a each are arranged at its long side a in the X-axis direction and at its short side b in the Y-axis direction. The adjacent slots 72a in the Y-axis direction is spaced in a predetermined distance l at each center thereof. Thus, the external dimension (A·B) of metallic earth film 72, the total number ($S_x \cdot S_y$) of slots 72a, each dimension (a, b, l) of the slot 72a are determined to ensure sufficient sensivity for providing communication with the transmitting station on the geostationary satellite. In the case that the number of $S_y$ is sufficient large, it is not necessary to provide any connection for a matching load terminal 74a of the feeder line circuit 74. In determination of the distance l in the Y-axis direction, the following equation (1) must be satisfied to make each electric field of slots 72a in-phase at each radius vector angle of $\phi=90°$ and $\theta=\theta_0$ as shown in FIG. 11.

$$ko\, l \sin \theta_o - \beta g\, l = 2p\pi \quad (1)$$

provided that:

p=0, ±1, ±2, ...
$K_o = 2\pi/\lambda o$
$Bg = 2\pi/\lambda g$ where $\lambda o$ represents a free space wave length, and $\lambda g$ represents a strip line propagation wave length.

The dielectric layer 73 is made of a dielectric material of dielectric constant $\epsilon$ (specific inductive capacity $\epsilon_r$) to have a thickness t. The dielectric layer 73 is overlapped with the rear surface of metallic earth film 72 to propagate therethrough an incident electric power applied to the slots 72a toward an output terminal 74b of the feeder line circuit 74. The feeder line circuit 74 includes a plurality of feeders 74c which are made of a copper film respectively and overlapped with the rear surface of dielectric layer 73 in the Y-axis direction. As shown in FIG. 3, the feeders 74c each are positioned between each pair of adjacent slots 72a arranged in the X-axis direction and spaced in a distance G from the adjacent feeder. The output terminal 74b of feeder line circuit 74 is connected to an input terminal of BS-converter 40.

Figure 7:
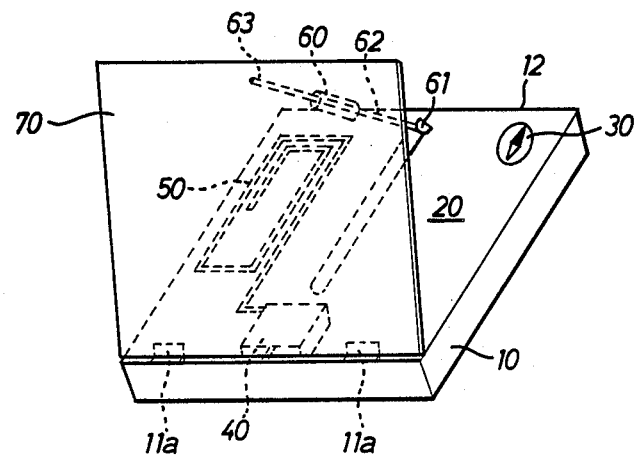
FIG. 7 illustrates an installed condition of the portable receiving antenna system.

When it is desired to install the portable receiving antenna system at an appropriate place for receiving communication (electromagnetic waves of wave length $\lambda$) from the satellite transmitting station, the flat plate antenna 70 is lifted and supported by the support assembly 60 at an inclined angle, as shown in FIG. 7. Subsequently, the IF-cable 50 is taken out of the receiver case 10 and connected to an input terminal of the television set. The receiver case 10 is rotated on an appropriate stationary surface in such a manner as to make the pointer of azimuth compass 30 coincident with the standard directional indication scale. Thus, the flat plate antenna 70 is pointed toward the direction of the geostationary satellite. Thereafter, the television set is turned on, and in turn, fine adjustment of the support assembly 60 is carried out to maximize the receiving sensitivity of the television. In such a situation, it is able to adjust the direction of flat plate antenna 70 in a simple manner since the azimuth compass 30, BS-converter 40 and IF-cable 50 are contained in the receiver case 10.

In an experiment of the above-described portable receiving antenna system, each dimension of the flat plate antenna 70 has been determined as follows.

Figure 8:
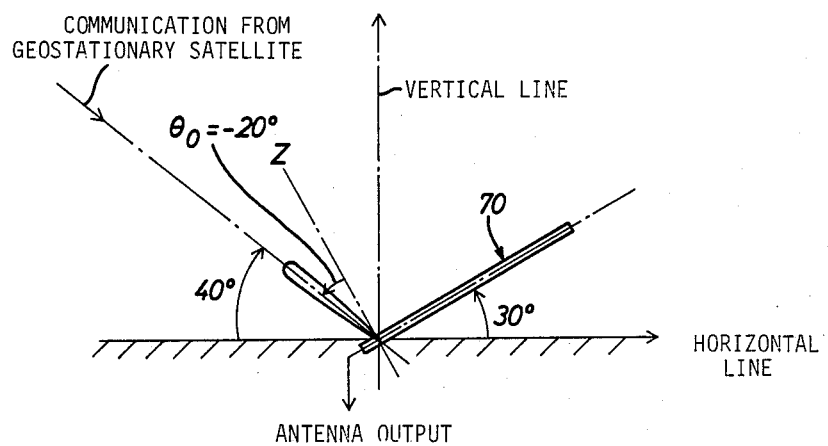
FIG. 8 illustrates a spatial position of the flat plate antenna pointed toward the direction of a geostationary satellite.
Figure 12:
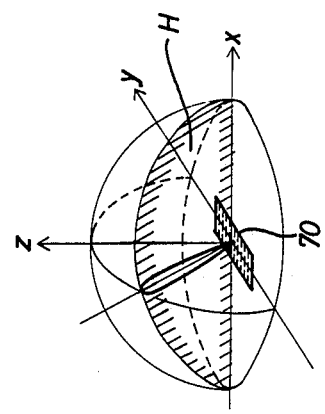
Figure 9:
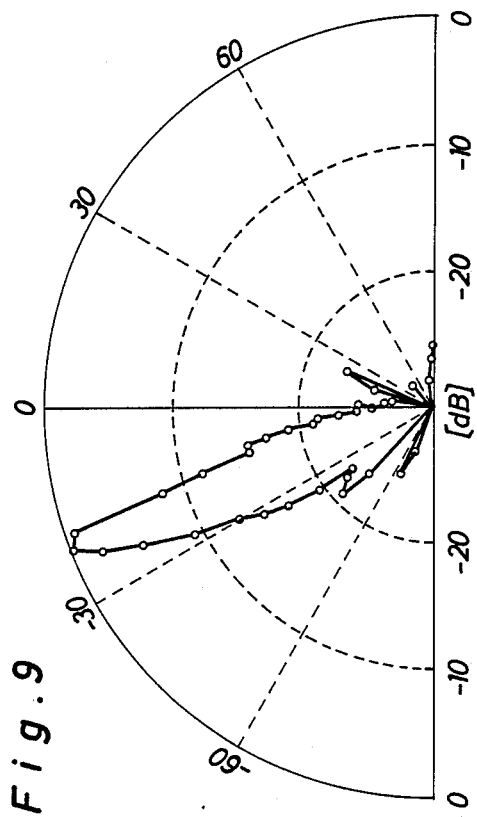
FIGS. 9 and 10 each illustrate a radiation pattern of the portable receiving antenna system.
Figure 10:
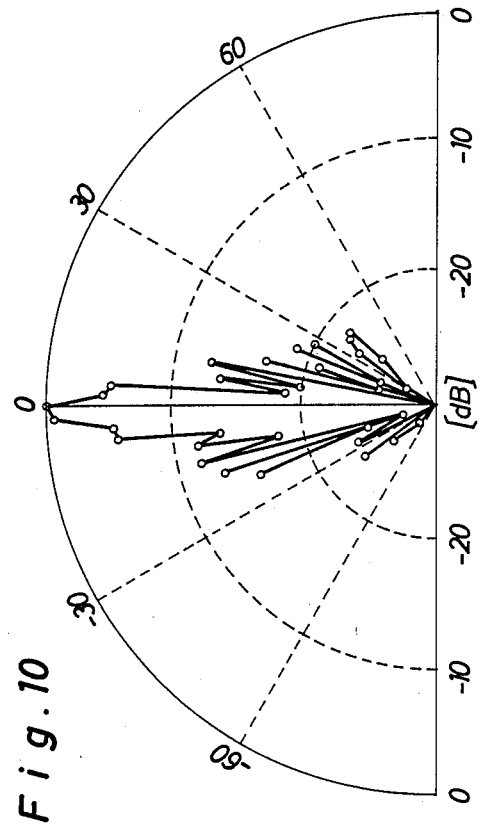

External dimension of the earth film 72:
A=520 mm, B=550 mm
Each dimension of the slots 72a:
a=10 mm≈$\lambda g$/2
b=0.5 mm<<$\lambda g$
l=14.5 mm
Number of the slots 72a:
$S_x$=28, $S_y$=34
Space between the adjacent feeders 74c:
G=36 mm
Values related to the dielectric layer 73:
$\epsilon_r$=2.17, $\epsilon_{eff}$=1.93, t=0.787 mm When the experiment was carried out in the Chubu region in Japan, a maximum sensitive direction of the flat plate antenna 70 was coincident with the direction of the geostationary satellite in a condition where the flat plate antenna 70 was inclined at 30° and at each radius vector angle of $\phi=90°$ and $\theta=\theta_o=-20°$, as shown in FIG. 8. In this case, the strip line propagation wave length $\lambda g$ was equal to $\lambda o/\sqrt{\epsilon_{eff}}$=18 mm (f=12 GHz), the distance D between the reflection plate 71 and the feeder line circuit 74 was equal to $\lambda o/4$, and the incident angle of the geostationary satellite was 40°. FIGS. 9 and 10 illustrate radiation pattern characteristics of the flat plate antenna 70 obtained in the experiment. The radiation pattern of FIG. 9 was obtained in a plane E in a condition where the flat plate antenna 70 was positioned as shown in FIG. 11, and the radiation pattern of FIG. 10 was obtained in a plane H in a condition where the flat plate antenna 70 was positioned as shown in FIG. 12. From these radiation pattern characteristics, it will be understood that the flat plate antenna 70 is superior in its directivity. From the dimension of the flat plate antenna 70, it will be also understood that the portable receiving antenna system can be constructed small in size and light in weight suitable for portage.

In the case that the flat plate antenna 70 is set in a horizontal plate to receive communication from the geostationary satellite, the external dimension of the flat plate antenna 70 will be determined to be one and half times of the flat plate antenna adapted to the experiment. In such a case, the distance l in the Y-axis direction will be determined to be 11.7 mm, and the numbers of $S_x$ and $S_y$ will be increased or decreased in accordance with the external dimension of the flat plate antenna 70 and the distance l.

In the actual practice of the present invention, the metallic earth film 72 may be replaced with another metallic thin plate formed with the slots 72a, and each configuration of the slots 72a may be modified in a triangle, a square or the like.

Figure 13:
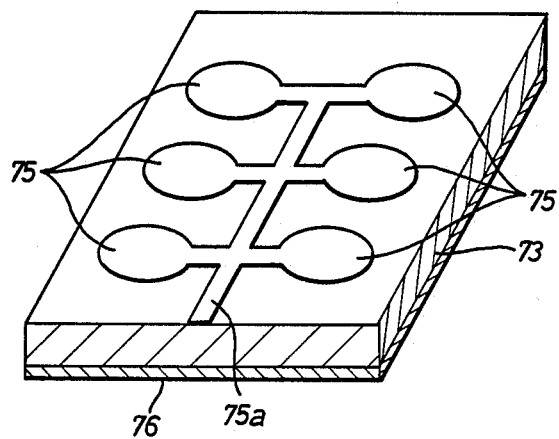
FIG. 13 is a partly broken perspective view of a modification of the flat plate antenna.

Alternatively, the flat plate antenna 70 may be modified in a triangle flat plate. In FIG. 13, there is illustrated a modification of the flat plate antenna 70 wherein the metallic earth film 72 and feeder line circuit 74 secured to the dielectric layer 73 are replaced with a plurality of spaced circular metallic thin plates 75 and a feeder line circuit 75a secured to a front surface of the dielectric layer 73. In this modification, the circular metallic thin plates 75 are arranged to receive electromagnetic waves from the satellite transmitting station and connected to each other by means of the feeder line circuit 75a. Furthermore, an earth metallic plate 76 is secured to the rear surface of dielectric layer 73.

Figure 14:
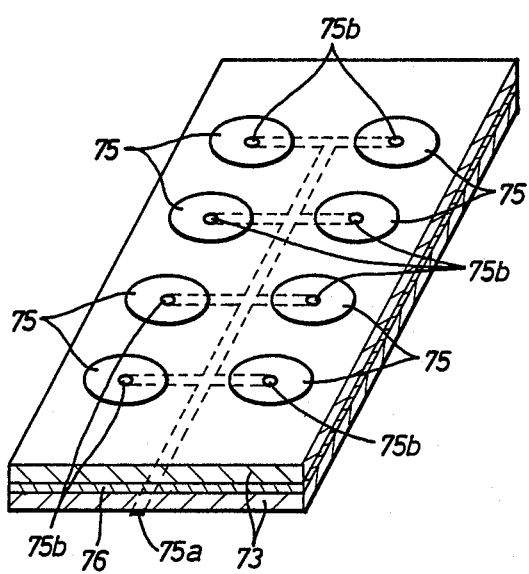
FIG. 14 is a partly broken perspective view of another modification of the flat plate antenna.
Figure 15:
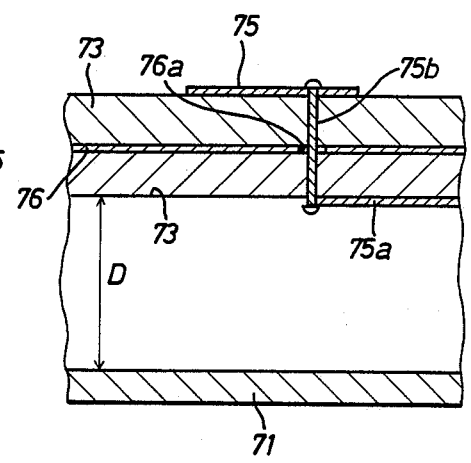
FIG. 15 is an enlarged sectional view of a part of the flat plate antenna shown in FIG. 14.

In FIGS. 14 and 15, there is illustrated another modification of the flat plate antenna 70 wherein the metallic earth film 72 and feeder line circuit 74 secured to the dielectric layer 73 are replaced with a plurality of spaced circular metallic thin plates 75 overlapped with a front surface of an upper dielectric layer 73 and a feeder line circuit 75a secured to the rear surface of a lower dielectric layer 73. In this modification, a metallic earth plate 76 is interposed between the upper and lower dielectric layers 73 and 73, and the circular metallic thin plates 75 are arranged to receive electromagnetic waves from the satellite transmitting station and connected to the feeder line circuit 75a by means of ancillary feeders 75b through the dielectric layers 73 and earth metallic plate 76. The ancillary feeders 75b are insulated from the earth metallic plate 76.

Having now fully set forth the preferred embodiment and certain modifications of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A portable receiving antenna system for providing communication with a transmitting station carried by a geostationary satellite, comprising:
    a portable case;
    a flat plate antenna assembled with said portable case;
    an azimuth compass mounted within said portable case so that a pointer of said compass points to a standard directional indication scale when said portable case is pointing to receive electromagnetic wavas from said transmitting station; and
    an adjustable support arranged within said portable case to support said flat plate antenna at an incident angle capable of receiving said electromagnetic waves from said transmitting station,
    said adjustable support including:
        a universal joint secured to one side of said portable case,
        a first support rod connected at one end thereof to said universal joint to be inclined in an appropriate direction, and
        a second support rod having one end adjustably coupled with another end of said first support rod and another end for engagement with said flat plate antenna so that the entire length of said first and second support rods is determined to support said flat plate antenna at the incident angle.

2. A portable receiving antenna system as recited in claim 1, wherein:
    said first support rod is integrally provided at the another end thereof with a screw element, and
    said second support rod is formed at the one end thereof with a screw element adjustably threaded into the screw element of said first support rod.

3. A portable receiving antenna system as recited in claim 1, wherein said flat plate antenna is in the form of a flat plate micro strip line slot array antenna.

4. A portable receiving antenna system for providing communication with a transmitting station carried by a geostationary satellite, comprising:
    a square portable case provided therein with a square base plate and having a square opening;
    a square flat plate antenna hinged at one side thereof to one side of said portable case to open and close the opening of said case;
    an azimuth compass mounted on said base plate in said portable case so that a pointer of said compass points to a standard directional indication scale when said portable case is pointing to receive electromagnetic waves from said transmitting station, said compass being located at a position adjacent the other side of said portable case opposed to the one side of the same; and
    an adjustable support arranged within said portable case to support said flat plate antenna at an incident angle capable of receiving said electromagnetic waves from said transmitting station, said adjustable support including:
        a universal joint secured to the other side of said portable case,
        a first support rod connected at one end thereof to said universal joint to be moved in an appropriate direction, and
        a second support rod having one end adjustably coupled with an another end of said first support rod and another end for engagement with said flat plate antenna so that the entire length of said support rods is determined to support said flat plate antenna at the incident angle.

5. A portable receiving antenna system as recited in claim 4, wherein said flat plate antenna is in the form of a flat plate micro strip line slot array antenna.

6. A portable receiving antenna system as recited in claim 4, wherein:
    said compass is embedded within said base plate, and said first and second support rods are detachably embedded within said base plate in said portable case.

7. A portable receiving antenna system as recited in claim 12, further comprising:
a converter mounted on said base plate at a place adjacent the one side of said portable case and connected to an output terminal of said flat plate antenna to translate an output frequency from said plate antenna into an input frequency for a receiving set, and
a detachable cable contained within said portable case to connect said converter to an input terminal of said receiving set.

8. A portable receiving antenna system as recited in claim 7, wherein said receiving set is a television set.

9. A portable receiving antenna system as recited in claim 7, wherein said converter and said cable are embedded within said base plate in said portable case.

* * * * *